United States Patent
Piećko

(10) Patent No.: US 11,893,022 B2
(45) Date of Patent: Feb. 6, 2024

(54) COMPUTER-IMPLEMENTED METHOD FOR IMPROVING QUERY EXECUTION IN RELATIONAL DATABASES NORMALIZED AT LEVEL 4 AND ABOVE

(71) Applicant: DataWalk Spółka Akcyjna, Wroclaw (PL)

(72) Inventor: Krystian Piećko, Wroclaw (PL)

(73) Assignee: DataWalk Spółka Akcyjna, Wroclaw (PL)

( * ) Notice: Subject to any disclaimer, the term of this patent is extended or adjusted under 35 U.S.C. 154(b) by 76 days.

(21) Appl. No.: 16/058,025

(22) Filed: Aug. 8, 2018

(65) Prior Publication Data

US 2019/0042624 A1 Feb. 7, 2019

Related U.S. Application Data

(63) Continuation of application No. 14/469,958, filed on Aug. 27, 2014, now Pat. No. 10,095,743.

(30) Foreign Application Priority Data

Aug. 30, 2013 (EP) ..................................... 13461545

(51) Int. Cl.
*G06F 16/2455* (2019.01)
*G06F 16/28* (2019.01)
*G06F 16/22* (2019.01)

(52) U.S. Cl.
CPC ...... *G06F 16/2455* (2019.01); *G06F 16/2255* (2019.01); *G06F 16/24553* (2019.01); *G06F 16/284* (2019.01)

(58) Field of Classification Search
CPC ............... G06F 16/2455; G06F 16/284; G06F 16/2255; G06F 16/24553
See application file for complete search history.

(56) References Cited

U.S. PATENT DOCUMENTS 5,257,349 A 10/1993 Alexander
5,418,961 A 5/1995 Segal et al.
(Continued)

FOREIGN PATENT DOCUMENTS

| EP | 0592046 A2 | 4/1994 |
| EP | 2455869 A1 | 5/2012 |
| WO | WO-02059793 A3 | 4/2003 |

OTHER PUBLICATIONS

Anonymous: II sql—Relational database design question—Surrogate-key or Natural-key?—Stack Overflow, Sep. 19, 2010 (Sep. 19, 2010), XP055109921, Retrieved from the Internet: URL:http://stackoverflow.com/questions/3747730/relational-database-design-question-surrogate-key-or-natural-key [retrieved on Mar. 25, 2014] "see answer from Mitch Dempsey".

(Continued)

*Primary Examiner* — Mariela Reyes
*Assistant Examiner* — Fernando M Mari Valcarcel
(74) *Attorney, Agent, or Firm* — Wilson Sonsini Goodrich & Rosati

(57) ABSTRACT

Computer implemented methods for executing a database query in a database using an electronic computing device are presented, the method including: causing the electronic computing device to provide at least one data structure including at least one object having at least two properties of different data types; identifying a property of the at least one data structure that includes the smallest unique values in terms of type of data stored in that particular property; executing the database query, including any limiting parameters, configured to retrieve only data from the property including the smallest unique values that arc retrievable for a record; retrieving a predefined number of results of the executed database query; and for each set of predefined number of retrieved results, executing a new database access (Continued)

thread that is configured to retrieve data that are present in the records identified with the smallest unique values.

16 Claims, 8 Drawing Sheets

(56) References Cited

U.S. PATENT DOCUMENTS

| | | | |
|---|---|---|---|
| 5,548,758 | A | 8/1996 | Pirahesh et al. |
| 5,604,899 | A | 2/1997 | Doktor |
| 6,038,566 | A | 3/2000 | Tsai |
| 6,105,035 | A | 8/2000 | Monge et al. |
| 6,163,775 | A | 12/2000 | Wlaschin et al. |
| 6,192,371 | B1 | 2/2001 | Schultz |
| 6,934,712 | B2 | 8/2005 | Kiernan et al. |
| 6,947,945 | B1 | 9/2005 | Carey et al. |
| 6,986,102 | B1 | 1/2006 | Baer et al. |
| 7,058,622 | B1 | 6/2006 | Tedesco |
| 7,243,106 | B2 | 7/2007 | Vierich et al. |
| 7,363,593 | B1 | 4/2008 | Loyens et al. |
| 7,895,191 | B2 | 2/2011 | Colossi et al. |
| 8,103,703 | B1 | 1/2012 | Jetter et al. |
| 8,224,829 | B2 | 7/2012 | Pauly |
| 8,364,623 | B1 | 1/2013 | Bunker et al. |
| 8,386,920 | B2 | 2/2013 | Cox et al. |
| 8,793,246 | B1* | 7/2014 | Mathur .............. G06F 16/24578 |
| | | | 707/723 |
| 8,874,621 | B1 | 10/2014 | Goodwin et al. |
| 9,218,380 | B2 | 12/2015 | Adzic et al. |
| 9,483,508 | B1 | 11/2016 | Wilkes et al. |
| 9,747,312 | B2 | 8/2017 | Piecko |
| 10,002,143 | B2 | 6/2018 | Piecko et al. |
| 2001/0051948 | A1 | 12/2001 | Srinivasan et al. |
| 2002/0029209 | A1 | 3/2002 | Bernal et al. |
| 2002/0083166 | A1* | 6/2002 | Dugan ................. H04Q 3/0058 |
| | | | 709/223 |
| 2002/0087539 | A1* | 7/2002 | Muraoka ............. G06F 16/284 |
| 2003/0088545 | A1* | 5/2003 | Subramaniam ....... G06F 16/284 |
| 2003/0208493 | A1 | 11/2003 | Hall et al. |
| 2003/0229640 | A1* | 12/2003 | Carlson ............ G06F 16/24553 |
| 2004/0088283 | A1 | 5/2004 | Lissar et al. |
| 2004/0133581 | A1 | 7/2004 | Shinjo |
| 2004/0139102 | A1 | 7/2004 | Vierich et al. |
| 2004/0255301 | A1 | 12/2004 | Turski et al. |
| 2005/0039033 | A1 | 2/2005 | Meyers et al. |
| 2005/0216503 | A1 | 9/2005 | Charlot et al. |
| 2005/0228818 | A1 | 10/2005 | Murthy et al. |
| 2006/0173841 | A1 | 8/2006 | Bill |
| 2006/0288035 | A1 | 12/2006 | Viavant |
| 2007/0112803 | A1 | 5/2007 | Pettovello |
| 2007/0198557 | A1 | 8/2007 | Ching et al. |
| 2008/0021864 | A1 | 1/2008 | Bakalash et al. |
| 2008/0033987 | A1 | 2/2008 | Carter |
| 2008/0162427 | A1* | 7/2008 | Connearney .......... G06F 16/284 |
| 2008/0183658 | A1 | 7/2008 | Mangipudi |
| 2008/0301181 | A1 | 12/2008 | Lori |
| 2009/0103715 | A1 | 4/2009 | Thorbjornsson |
| 2009/0182710 | A1* | 7/2009 | Short .................. G06F 16/2291 |
| 2009/0222408 | A1 | 9/2009 | Charles et al. |
| 2010/0287212 | A1 | 11/2010 | Becker |
| 2010/0299348 | A1 | 11/2010 | Gill et al. |
| 2011/0231438 | A1 | 9/2011 | Pfeifle et al. |
| 2011/0289112 | A1* | 11/2011 | Kamimura .......... G06F 16/2379 |
| | | | 707/769 |
| 2012/0096002 | A1 | 4/2012 | Sheehan et al. |
| 2012/0117027 | A1 | 5/2012 | Shau et al. |
| 2012/0233207 | A1* | 9/2012 | Mohajer ............. G06F 16/3334 |
| | | | 707/769 |
| 2012/0246147 | A1 | 9/2012 | Lamb et al. |
| 2012/0284635 | A1 | 11/2012 | Sitrick et al. |
| 2012/0317141 | A1* | 12/2012 | Qiao .................... G06F 16/313 |
| | | | 707/769 |
| 2013/0047155 | A1* | 2/2013 | Caspole ............... G06F 9/5055 |
| | | | 718/1 |
| 2013/0083104 | A1 | 4/2013 | Mitsuki |
| 2013/0086104 | A1 | 4/2013 | Morrison et al. |
| 2013/0091180 | A1 | 4/2013 | Vicat-Blanc-Primet et al. |
| 2013/0144917 | A1 | 6/2013 | Hosurmath et al. |
| 2013/0307843 | A1 | 11/2013 | Sikka et al. |
| 2013/0311518 | A1 | 11/2013 | Agbaria |
| 2014/0046983 | A1 | 2/2014 | Galloway et al. |
| 2014/0297693 | A1 | 10/2014 | Piecko |
| 2015/0006507 | A1 | 1/2015 | Piecko |
| 2015/0066986 | A1 | 3/2015 | Piecko |
| 2018/0018357 | A1 | 1/2018 | Piecko |

OTHER PUBLICATIONS

Office Action dated May 26, 2017 for U.S. Appl. No. 14/469,958.
Office action dated Sep. 12, 2016 for U.S. Appl. No. 14/469,958.
Office Action dated Dec. 22, 2017 for U.S. Appl. No. 14/469,958.
U.S. Appl. No. 14/469,958 Notice of Allowance dated Jun. 29, 2018.
European Patent Office Search Report; RE. Application No. 13461516.0-1951 dated Jul. 30, 2013.
European Patent Office Search Report; RE. Application No. 13461536.8-1951 dated Sep. 10, 2013.
European Patent Office Search Report; RE. Application No. 13461545.9-1952 dated Apr. 25, 2014.
European Patent Office Search Report; RE. Application No. 13461546.7-1952 dated Apr. 11, 2014.
European Search Report dated Feb. 16, 2017 for European Patent Application No. EP16197450.6.
European Search Report dated May 18, 2017 for European Patent Application No. 16203912.7.
Notice of Allowance dated Apr. 10, 2017 for U.S. Appl. No. 14/469,968.
Notice of Allowance dated Apr. 28, 2017 for U.S. Appl. No. 14/469,968.
Notice of Allowance dated Jul. 26, 2017 for U.S. Appl. No. 14/469,968.
Notice of Allowance dated Dec. 19, 2017 for U.S. Appl. No. 14/222,795.
Office action dated Feb. 11, 2016 for U.S. Appl. No. 14/222,795.
Office Action dated Mar. 13, 2017 for U.S. Appl. No. 14/315,481.
Office Action dated Apr. 28, 2017 for U.S. Appl. No. 14/222,795.
Office action dated Jun. 2, 2016 for U.S. Appl. No. 14/222,795.
Office Action dated Jul. 3, 2017 for U.S. Appl. No. 14/315,481.
Office action dated Aug. 22, 2016 for U.S. Appl. No. 14/315,481.
Office action dated Aug. 26, 2016 for U.S. Appl. No. 14/469,968.
Office Action dated Sep. 22, 2016 for U.S. Appl. No. 14/222,795.
Office Action dated Dec. 21, 2016 for U.S. Appl. No. 14/469,968.
U.S. Appl. No. 14/222,795 Notice of Allowance dated Jan. 29, 2018.
U.S. Appl. No. 14/315,481 Office Action dated May 17, 2018.
Girvan et al. Community structure in social and biological networks. Proc Natl Acad Sci U S A. Jun. 11, 2002; 99(12): 7821-7826.
PCT/EP2017/059892 International Search Report and Written Opinion dated May 30, 2017.
U.S. Appl. No. 14/315,481 Notice of Allowance dated Nov. 28, 2018.

\* cited by examiner

| 101 | 102 | 103 | 104 | 105 |
|---|---|---|---|---|
| ID | NAME | SURNAME | CITY | Address |
| 1 | A | A | C1 | A1 |
| 2 | B | B | C2 | A2 |
| 3 | C | C | C3 | A3 |

Employees

| 106 | 107 | 108 |
|---|---|---|
| Employee_ID | Description | Name |
| 1 | H1D | H1N |
| 2 | H2D | H2N |
| 3 | H3D | H3N |

Hobbies

| 109 | 110 | 111 |
|---|---|---|
| Employee_ID | Description | Name |
| 1 | S1D | S1N |
| 2 | S2D | S2N |
| 3 | S3D | S3N |

Skills

Fig. 1 (Prior Art)

| 101 | 102 | 103 | 104 | 105 |
|---|---|---|---|---|
| ID | NAME | SURNAME | CITY | Address |
| 1 | A | A | C1 | A1 |
| 2 | B | B | C2 | A2 |
| 3 | C | C | C3 | A3 |

Employees

| 106 | 107 | 108 | 110 | 111 |
|---|---|---|---|---|
| Employee_ID | Hobby_Description | Hobby_Name | Skills_Description | Skills_Name |
| 1 | H1D | H1N | S1D | S1N |
| 2 | H2D | H2N | S2D | S2N |
| 3 | H3D | H3N | S3D | S3N |

Hobbies_Skills

Fig. 2 (Prior Art)

| 101 | 102 | 103 | 104 | 105 |
|---|---|---|---|---|
| ID | NAME | SURNAME | CITY | Address |
| 1 | A | A | C1 | A1 |
| 2 | B | B | C2 | A2 |
| 3 | C | C | C3 | A3 |

Employees

| 106 | 112 |
|---|---|
| Employee_ID | Hobby_ID |
| 1 | 1 |
| 2 | 2 |
| 3 | 3 |

Employee_Hobby

| 106 | 113 |
|---|---|
| Employee_ID | Skill_ID |
| 1 | 1 |
| 2 | 2 |
| 3 | 3 |

Employee_Skill

| 115 | 110 | 111 |
|---|---|---|
| Skil_ID | Skills_Description | Skills_Name |
| 1 | S1D | S1N |
| 2 | S2D | S2N |
| 3 | S3D | S3N |

Skill

| 114 | 107 | 108 |
|---|---|---|
| Hobby_ID | Hobby_Description | Hobby_Name |
| 1 | H1D | H1N |
| 2 | H2D | H2N |
| 3 | H3D | H3N |

Hobby

Fig. 3 (Prior Art)

```
String tableName = "TableName";
String smallestColumnName = getSmallestUniqueValueForTable(tableName);
String query = "";
if ( defined filters exists )
        while ( filters has next )
                if ( query is not empty ) {
                        query += filters.get().getSetOperator();
                query += filter.getSubQuery();
smallestUniqValueResultSet = executeQuery(query);
integer numberOfResults = 100;
integer executeThreadsNumber = 5;
while( smallestUniqValueResultSet has more results )
        Results results = smallestUniqValueResultSet.getPart(numberOfResults);
        fetchWholeRowInOtherThread(results);
```

Fig. 5

COMPUTER-IMPLEMENTED METHOD FOR IMPROVING QUERY EXECUTION IN RELATIONAL DATABASES NORMALIZED AT LEVEL 4 AND ABOVE

CROSS-REFERENCE

This application is a continuation of U.S. patent application Ser. No. 14/469,958, filed Aug. 27, 2014, now U.S. Pat. No. 10,095,743, which claims priority to European Application No. EP13461545.9, filed Aug. 30, 2013, each of which applications is entirely incorporated herein by reference.

BACKGROUND

The disclosure is related to computer-implemented methods for database query execution optimization. The method finds its application in data retrieval and processing systems.

According to WIKIPEDIA (www.wikipedia.org), JOIN type queries are defined as follows. "A(sic) SQL (Structured Query Language) JOIN clause combines records from two or more tables in a database. It creates a data set that may be saved as a table or used as it is. A JOIN query is a means for combining fields from two tables by using values common to each. The ANSI standard SQL specifies four types of JOIN: INNER, OUTER, LEFT, and RIGHT. As a special case, a table (base table, view, or joined table) can JOIN to itself in a self-join."

A programmer writes a JOIN predicate to identify the records for joining. If the evaluated predicate is true, the combined record is then produced in the expected format, a record set or a temporary table.

Present relational databases are often normalized in order to eliminate duplication of information when objects may have one-to-one, one-to-many or many-to-many relationships. For example, a single Department may be associated with many different Employees. Joining two tables effectively creates another table which combines information from both tables. This is at some expense in terms of the time it takes to compute the join.

Much work in database systems has aimed at efficient implementation of joins, because relational systems very commonly call for joins, yet face difficulties in optimizing their efficient execution. In cases where a query requires joining more than one data structure, the time of execution may increase exponentially.

Three fundamental algorithms for performing a JOIN type operations exist: a nested loop join that is a simple algorithm that joins two sets by using two nested loops; a sort-merge join that is an algorithm to first sort the relations by the join attribute, so that interleaved linear scans will encounter these sets at the same time; and a hash join that is an algorithm performed by hashing one data set into memory based on join columns and reading the other one and probing the hash table for matches.

As previously mentioned, relational databases are often normalized. The aim of normalization is to store only the minimal amount of information, to remove redundancies in the data, to remove anomalies and to restructure data in order to provide more efficient storage.

The concept of data normalization was developed by E. G. Codd in 1970. Mr. Codd in his publication on "Further Normalization of the Data Base Relational Model" defined normal forms to reduce the amount of redundancy and inconsistent dependency within databases. Mr. Codd defined three normal forms but during subsequent years two more normal forms have been introduced.

There are four most commonly used normal forms: first (1NF), second (2NF) and third (3NF) normal forms, and sometimes used Boyce-Codd normal form (BCNF).

There is also known a Fourth normal form (4NF), which is a normal form used in database normalization. Introduced by Ronald Fagin in 1977, 4NF is the next level of normalization after Boyce-Codd normal form (BCNF). Whereas the second, third, and Boyce-Codd normal forms are concerned with functional dependencies, 4NF is concerned with a more general type of dependency known as a multi-valued dependency [source: WIKIPEDIA].

There also exists a Fifth normal form (5NF), also known as a join-projection normal form (JPNF), which states that no non-trivial join dependencies exist. The 5NF states that any fact should be able to be reconstructed without any anomalous results in any case, regardless of the number of tables being joined. A 5NF table should have only candidate keys and its primary key should consist of a single column.

The problem with these normal forms is the size of the joins that are required to reconstruct any non-trivial data. A developer can rely on views and procedures to simplify them, but the underlying data still ends up very complex. There are also performance issues to consider—which is why 4NF and 5NF are often academic. In most cases, 3NF (or BCNF) are implemented. (source: http://www.devshed.com/c/a/Administration/Database-Normalization/4/).

Normalization produces many tables, each having relatively few columns, for example two columns—a primary key and a value. To use the normalized data contained in these columns, one has to put the information back together by joining the columns using their primary/foreign key relationships.

Executing queries to a normalized database typically requires retrieval of stored data from multiple normalized tables. The normalized database therefore needs to locate and retrieve the requested tables and then join the information from the tables to respond to the data request.

Join type queries may reduce database performance by slowing processing down and by placing heavy processing stress on computer hardware. Normalized databases need more CPU, memory, and I/O to process transactions and queries than unnormalized and denormalized databases. In the existing databases, JOIN type queries incur significant processing overhead, which leads to inability to work in real time.

Therefore, it would be very advantageous to increase the performance of database queries, especially of JOIN type queries as they are crucial to normalized databases.

Some conventional art databases implement so-called query optimization techniques. Query optimization is a function of database management systems, such as relational database management systems (RDBMS). The query optimizer attempts to determine the most efficient way to execute a given query by considering the possible query plans. In typical implementations, the query optimizer cannot be accessed directly by RDBMS users: once queries are submitted to a database server, and parsed by the parser, they are then passed to the query optimizer where optimization occurs.

For example, a US patent publication U.S. Pat. No. 5,548,758 entitled "Optimization of SQL queries using early-out join transformations of column-bound relational tables" discloses a method and apparatus for optimizing SQL queries in a relational database management system that uses early-out join transformations. An early-out join comprises a many-to-one existential join, wherein the join scans an inner table for a match for each row of the outer table and terminates the scan for each row of the outer table when a single match is found in the inner table. To transform a many-to-many join to an early-out join, the query must include a requirement for distinctiveness, either explicitly or implicitly, in one or more result columns for the join operation. Distinctiveness can be specified using the DISTINCT word in the SELECT clause or can be implied from the predicates present in the query. The early-out join transformation also requires that no columns of the inner table be referenced after the join, or if an inner table column is referenced after the join, that each referenced column be "bound". A referenced column can be bound in one of three ways: (1) an inner table column can be bound to a constant through an equality predicate, (2) an inner table column can be bound to an outer table column, or (3) an inner table column can be bound to a correlated value, wherein the correlated value originates outside the query block. In all three cases, an inner table column can be bound through the transitivity of equality predicates.

A US patent application US20120246147 entitled "MODULAR QUERY OPTIMIZER", discloses computer programs encoded on a computer storage medium that provide for a modular query optimizer. In one aspect, a computer program product includes selecting one or more projections from a set of projections for each table in a database query wherein each of the selected projections for the table has leads to an estimated lower execution cost for the query as compared to non-selected projections; generating join orders for the query based on data distribution of one or more of the selected projections among sites in a computer network wherein the join orders reflect different combinations of data distribution operations applied to the output of one or more of the query's joins; and selecting a join order from the join orders based on evaluation of the join orders using a cost model.

The drawbacks of known query optimization in normalized databases include for example increased memory and CPU requirements and difficulties in formulating complex queries.

Up to now, such problems have been addressed with a use of more powerful hardware, such as database servers having higher performance and more memory instead of solutions related to design of the databases and queries execution.

For example, a US patent application US2012117027 entitled "Methods and systems for hardware acceleration of database operations and queries for a versioned database based on multiple hardware accelerators" discloses a hardware accelerator that assists a host database system in processing its queries. The hardware accelerator comprises special purpose processing elements that are capable of receiving database query/operation tasks in the form of machine code database instructions, executing them in hardware without software, and returning the query/operation result back to the host system. Hence, the system relates to database systems that are optimized by using pure hardware acceleration.

As such, there is a need to design and implement an efficient database query execution optimization that would be more efficient than JOIN type queries. In particular, such optimization shall be aimed at increasing data retrieval performance in databases normalized at level 4NF or 5NF and shall preferably not require specialized hardware components.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. This Summary presents embodiments of the invention in a simplified form as a prelude to the more detailed description that is presented below.

As such, computer implemented methods for executing a database query in a database using an electronic computing device are presented, the method including: causing the electronic computing device to provide at least one data structure including at least one object having at least two properties of different data types; identifying a property of the at least one data structure that includes the smallest unique values in terms of type of data stored in that particular property; executing the database query, including any limiting parameters, configured to retrieve only data from the property including the smallest unique values that are retrievable for a record; retrieving a predefined number of results of the executed database query; and for each set of predefined number of retrieved results, executing a new database access thread that is configured to retrieve data that are present in the records identified with the smallest unique values.

In some embodiments, the identifying is based on database schema information. In some embodiments, the predefined number of results is between 75 and 150. In some embodiments, the retrieved results are stored in a hash table where the smallest unique values of the database query are keys and results of the subsequent database queries, are values of the hash table. In some embodiments, the database query executed by each thread, utilizes UNION operators between SELECT database queries limited with the values of the smallest unique value property. In some embodiments, the executing the database query utilizes, in case of cross-querying numerous data structures, an INTERSECT operator between sub-queries related to different data structures.

In some embodiments, the database is a database including: a first data structure, stored in the memory, including a definition of at least one data set where each data set includes a data set identifier and logically holds data objects of the same type; a second data structure, stored in the memory, including definitions of properties of objects where each property includes an identifier of the property and an identifier of a set, from the first data structure, the property is assigned to; a third data structure, stored in the memory, including definitions of objects where each object includes an identifier and an identifier of a set, from the first data structure, the object is assigned to; a fourth data structure, stored in the memory, including definitions of properties of each object where each property of an object associates a value with an object, from the third data structure, and a property of the set, from the second data structure, the object is assigned to; a fifth data structure, stored in the memory, including definitions of relations where each relation includes an identifier of the relation; and a sixth data structure, stored in the memory, for storing definitions of relations between objects where each objects relation associates a relation, from the fifth data structure, to two objects from the third data structure.

In other embodiments, computing device program products for executing a database query in a database using an electronic computing device using a computing device are presented, the computing device program product including: a non-transitory computer readable medium; first programmatic instructions for causing the electronic computing device to provide at least one data structure including at least one object having at least two properties of different data types; second programmatic instructions for identifying a property of the at least one data structure that includes the smallest unique values in terms of type of data stored in that particular property; third programmatic instructions for executing the database query, including any limiting parameters, configured to retrieve only data from the property including the smallest unique values that are retrievable for a record; fourth programmatic instructions for retrieving a predefined number of results of the executed query; and for each set of predefined number of retrieved results, fifth programmatic instructions for executing a new database access thread that is configured to retrieve data that are present in the records identified with the smallest unique values.

In some embodiments, the second programmatic instructions for identifying is based on database schema information. In some embodiments, the predefined number of results is between 75 and 150. In some embodiments, the retrieved results are stored in a hash table where the smallest unique values of the database query are keys and results of the subsequent database queries, are values of the hash table. In some embodiments, the database query executed by each thread, utilizes UNION operators between SELECT database queries limited with the values of the smallest unique value property. In some embodiments, the third programmatic instructions for executing the database query utilizes, in case of cross-querying numerous data structures, an INTERSECT operator between subqueries related to different data structures.

BRIEF DESCRIPTION OF THE DRAWINGS

These and other embodiments of the invention presented herein are accomplished by providing a computer-implemented method for query execution optimization. Further details and features of embodiments of the present invention, its nature and various advantages will become more apparent from the following detailed description of the preferred embodiments shown in a drawing, in which:

FIG. 1 presents an example of a structure normalized at level 2;

FIG. 2 shows a 3NF normalization for the database of FIG. 1;

FIG. 3 shows a 5NF normalization for the database of FIG. 1;

FIG. 5 shows an exemplary implementation of the method embodying features of the present invention shown in FIG. 4;

DETAILED DESCRIPTION

Figure 4:
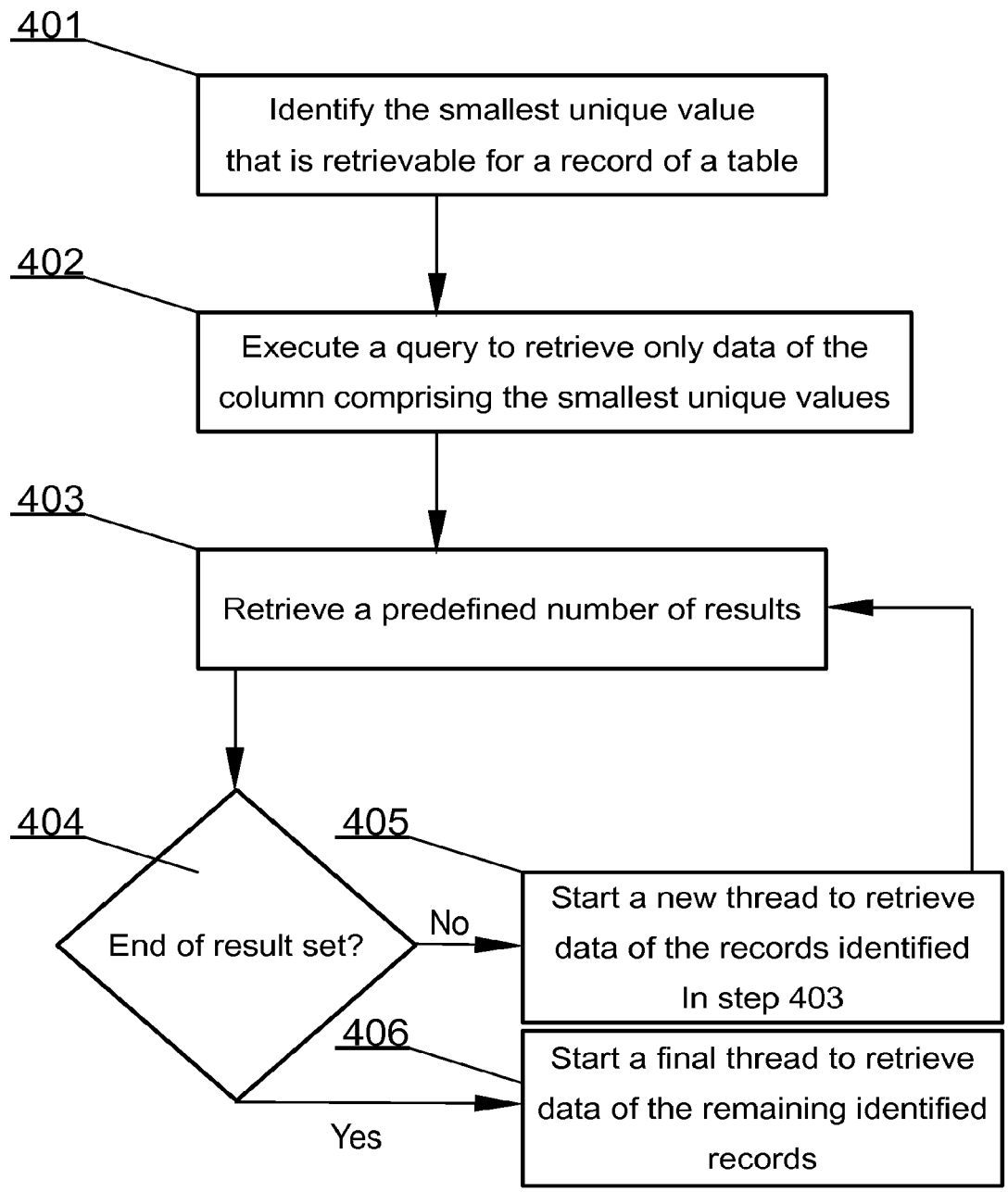
FIG. 4 presents a method for executing a database query embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In the following detailed description UNION, EXCEPT, INTERSECT operators will be called set operators.

FIG. 1 presents an example of a structure normalized at level 2. In the example of a relational database system presented in this figure, it is assumed that there is collected information on employees. The main 'Employees' table shall comprise information on personal data. An employee has an identifier 101, a name 102, a surname 103 and lives in a city 104 at a certain address 105.

There is also collected information on skills and hobbies of employees in the following manner. There is a 'Hobbies' table comprising the employee id 106 as a foreign key, description of the hobby 107 and its name 108. Similarly, there is a 'Skills' table comprising the employee id 109 as a foreign key, description of the skill 110 and its name 111.

A 3NF normalization for the database of FIG. 1 has been shown in FIG. 2. As can be seen, the Employees table remains the same, but the hobbies and skills tables have been combined into Hobbies_Skills table, which comprises columns (106-111) of both Hobbies and Skills table. Therefore, there number of tables has been decreased by one, but the addition of a new skill or hobby for a particular employee will require doubling of a record in the Hobbies_Skills table.

A 5NF normalization, as shown in FIG. 3, would bring the following changes. The Employee table remain the same, while in comparison to 3NF the Hobbies_Skills table has been split into four different tables. There are created two purely indexing tables of Employee_Hobby and Employee Skill, which comprise Employee_ID foreign key 106 and a local index 112, 113 of the hobby or skill, respectively. These two tables are links between Hobbies (columns 114, 107, and 108) and Skills tables (columns 115, 110, and 111), which in comparison to the original tables of FIG. 1 do not comprise any data from the Employees table.

As already explained, as the level of normalization increases, the computational effort required in order to access and filter data also increases dramatically. First of all, the time required at the database server in order to obtain the data increases. Second, the databases are designed such that when the results are ready locally, the database informs the client how to access the first item of the result set and then the client may iteratively retrieve all records of the result set. Typically, this is executed one by one record, in order to save bandwidth of the communications means between the client and the server. This approach arises from the fact that even though a result set may be large, not all data thereof need to be ready for presentation.

Therefore, any improvements related to minimizing computing effort at the server and/or decreasing data retrieval time between the client and the database server are crucial.

FIG. 4 presents a method for executing a database query embodying features of the present invention. Let's assume that in a simple example of FIG. 1 one needs to extract employees domiciled in a given city. This simple example may result in optimization of data delivery time rather that query processing time at the server.

In the remainder of this specification, a column of a table is equivalent to a property of an object of a given data structure (a set).

At a step 401, the system needs to establish, which column/property of a data table/structure comprises the smallest unique value for given records. It is not the actual value of data but rather type of data in such column/property that is taken into account. The size of values is typically determined as data field size. For example, values such as 64-bit integers are greater than values such as 16-bit integers.

In the example of FIG. 1 the ID column comprises the smallest unique values (i.e. an integer that is typically 32/64 bits vs. a String that is typically 256 bytes). In real life there may be cases where a record comprises several unique values within a set/table/structure. For example, a shopping article comprises an identifier, a QR (Quick Response) code and a manufacturing number, which are all unique for a given article.

The question whether a given unique column's data type value is smaller than another unique value may be answered using a database schema.

Database schema is a logical structure of a database that is typically defined in a DBMS (a Database Management System) with a use of a special language, for example a DDL (a Data Description Language). The internal database structure is defined as metadata (this term refers to "data about data") in a so-called information schema. In relational databases, the information schema is data that provide information about all of the tables and/or views and/or columns and/or procedures in a database. This set of data is database dependent and its accessing methods are usually database-dependent. It is however common for a database to provide such structure and access to it. The metadata will provide information on types of data in each column/property of each table. These types may be compared in order to find the smallest unique value column/property.

The identification, in a step 401, of the smallest unique value that is retrievable for a record allows for decreasing amount of data necessary to be transferred from a database server to a database client.

At step 402, a query is executed, including any limiting parameters (a data filter), which shall retrieve only data from the column/property comprising the smallest unique value that is retrievable for a record. By such approach one decreases to minimum the amount of data to be retrieved.

Next, at step 403 the results retrieval starts. As soon as a predefined number of results (or all available results) has been retrieved, the system checks whether the results set's end has been reached at a step 404.

Typically, the predefined number of results will remain in the range between 75 to 150 because there may be a database limitation of a query cache and queries exceeding 150 elements may become too large to fit in a single query buffer thereby increasing computational effort required for query processing. On the other hand, splitting result into sets of several items may create significant overhead in threads management.

A hash table is preferably created where the smallest unique values of the query of section 402 are keys and results of queries of sections 405 and 406 are values of the hash table.

If there are more records in the result set, the method proceeds to a step 405 where a new database access thread is created that shall retrieve data that are present in the records identified with the smallest unique value selected in step 401. Otherwise, if there are no more results in the results set, the process retrieves the remaining records at a step 406 where a final thread is created that shall retrieve data of the remaining records identified.

Once a new thread at a step 405 is started, the process advances to a step 403, where another batch of results of the query execution at a step 402 is retrieved while the thread of a step 405 operates.

When a result set is obtained for the query executed in a data retrieval threads at steps 405 and 406, the data may be read into a previously defined hash table.

It is thus evident that there may be a plurality of threads started at a step 405, which may be executed in parallel.

Thus, the final results are obtained using parallel processing and the initial step of retrieving the data that are the smallest representative data of the complete result set.

In order to further improve efficiency of each thread created at steps 405 and 406 a set operator, in this case UNION operator is used in a query, which combines the result of two or more SELECT statements. The UNION statement has several requirements, which are that each SELECT statement within the UNION must have the same number of columns, and the columns must also have similar data types and the columns in each SELECT statement must be in the same order.

The use of the UNION operator incites the database server engine to differently approach the query processing than in case of a typical OR operator between different values of parameters. In case of UNION there are separate internal queries instead of separate parameters of a single query.

For example, a query executed in a thread may have a form similar to the one below defined based on table Employees of FIG. 1:

```
SELECT Employees.* FROM Employees WHERE ID=3
UNION
SELECT Employees.* FROM Employees WHERE ID=6
UNION
SELECT Employees.* FROM Employees WHERE ID=16
UNION
(...)
```

The process of executing a query at a step 402, including any limiting parameters, may be further optimized, especially in case where the selection of the particular values of the column/property comprising the smallest unique value requires inquiring with numerous data tables/structures.

At 4NF or 5NF, the typical JOIN type queries are often so complex that their execution may take hours of extensive data processing.

For example, suppose one needs to select employees who like cycling (separate hobbies table) and were promoted during the last two years (promotions table). In such cases instead of using JOIN type queries one may employ an INTERSECT operator. The INTERSECT operator may be used between two SELECT queries in order to return only values that match within both data sets returned by the respective SELECT queries.

For example:

```
SELECT Employee.ID FROM Employees WHERE
    Employee.NAME = 'ADAM'
        INTERSECT
        SELECT Hobbies.Employee_ID FROM
Hobbies WHERE Hobbies.Name = 'cycling';
```

This method will return a list of identifiers of employees whose name is Adam and who at the same time like cycling. Such an approach of utilizing INTERSECT instead of JOIN in order to find the smallest unique values may be very efficient.

The use of intersect queries may be much more efficient for cross-structure querying and embodiments of the present invention returns the best results, in terms of time of data retrieval, in case of complex cross-structure queries.

FIG. 5 shows an exemplary implementation of the method embodying features of the present invention shown in FIG. 4. for the sake of simplicity and presentation of a general idea that may be implemented in different programming languages, the present example is formulated in pseudo code.

The system presented herein may be especially useful in databases based on mind maps such as a database disclosed in the co-pending European Patent Application number EP13461516.0 (U.S. patent application Ser. No. 14/222,795) by the same Applicant, which is hereby incorporated in its entirety by reference. In that particular database type, it may be especially easy to execute a process of finding objects of interest that are related to different data structures because, a relation between objects is present in the OBJECT RELATIONS data structure.

The use of queries operating on data sets i.e. using set operators, in a mind-map type database provides improved results due to the structure of the database. Each query that is to take into account object descriptions, objects, relations, columns and sets would require each time to formulate a query, which due to heterogeneity of tables' sizes would be highly inefficient, especially when executed frequently.

The objects and their descriptions in structures of a mind map type database, comprise an object's identifier. Therefore, when searching for an object one may limit to only object characteristics data structure (i.e. the fourth data structure), because this structure unambiguously identifies an object. This has a special advantage during search of objects that are related to other objects of a different set. Such search may be formulated as follows:

For selected objects and a selected relation execute a search function on object relations with a selected relation's identifier From the characteristics structure select, by means of another search function, only those that fulfill the condition, for example in column 13 there is a value of 'ADAM';

Combine both queries with an INTERSECT operator.

Addition of another constraint related to a different value in a different column is merely an addition of a simple query and limiting the results with a use of INTERSECT operator.

What may be important is that the complete search process and browsing of results is focused on several queries that remain unchanged except for specific values of parameters, due to which there is not any need to write redundant programming code in order to cover more and more specific queries.

Owing to use of UNION and INTERSECT there exists a possibility of improved and faster processing of queries.

Another aspect related to UNION, INTERSECT and EXCEPT is that fundamentally different data structures may be queried for the same data.

The following section of the specification presents features of the Applicant's co-pending European Patent Application number EP13461516.0 (U.S. patent application Ser. No. 14/222,795).

Figure 6:
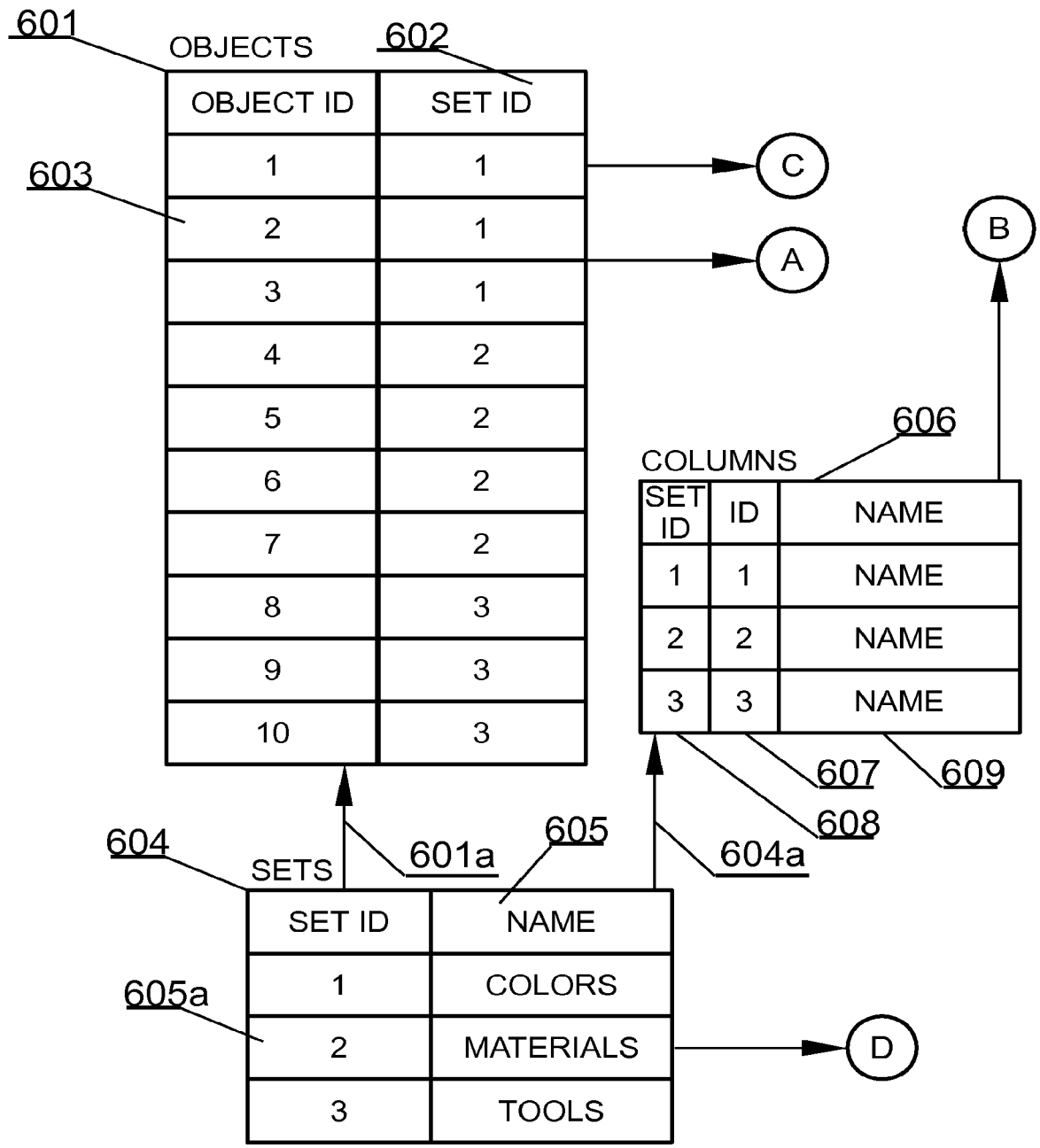
FIGS. 6 and 7 show a mind-map type database system embodying features of the present invention.

FIG. 6, corresponding to FIG. 2 of the co-pending application, shows a new database system according to the present invention. In order to perfectly cooperate with mind maps the database system according to the invention has been designed differently than known database systems. The database system comprises six core sets of data and optional sets. The core sets comprise SETS, OBJECTS, COLUMNS, CHARACTERISTICS, RELATIONS and OBJECTS RELATIONS. It has to be noted that the names above are exemplary only and the respective core sets are defined rather by their function within the system than their name.

A first set of data may be called SETS 604, because it is used to logically hold data related to sets of data. The sets of data may be represented on a mind map as nodes. Each entry in the SETS data structure 604 comprises at least a unique identifier 605a and preferably also its name 605. Referring back to example from FIG. 1 in the co-pending application there are three SETS, namely COLORS having ID of 1, MATERIALS having ID of 2 and TOOLS having ID of 3. The SETS data structure is a top level structure and does not refer to other data structures but other data structures refer to it as identified by respective arrows between the sets of FIG. 6.

Each set of data is, as in the real world, characterized by some properties typically called columns. Hence, the second set of data is called COLUMNS 606. A property, called typically a column, is uniquely identified with an identifier ID 607 and is associated with a set, defined in the SETS data structure 604, by means of an identifier herein called SET ID 608. A column also preferably is associated with a name 609. As indicated by an arrow 604a, the COLUMNS data structure logically, directly references the SETS data structure, because it uses the identifiers of sets. If for example each color of the set called COLORS had another property, say RGB value, there could be added an entry comprising the following values: '1', '4', 'RGB'. At this level of the system the types of respective data such as text, integer, Binary Large Object (BLOB) are not considered as their application in the present system.

Having defined data structures of SETS and COLUMNS there may be defined objects that will form elements of respective SETS and will have properties defined by the COLUMNS data structure. Objects are held in the a second data structure or OBJECTS 601 data structure. This data structure holds entries uniquely identified with an identifier ID 603 and associated with a set, defined in the SETS data structure 604, by means of an identifier herein called SET ID 602. As indicated by an arrow 601a, the OBJECTS data structure logically, directly references the SETS data structure, because it uses the identifiers of sets.

A fourth core data structure is a data structure that holds data entries of each property of each object. This data structure has been called CHARACTERISTICS 301 in FIG. 6. This is one difference from all known databases where there are rows of data that comprise entries for all columns of a data table. In the present invention each property of an object is stored as a separate entry, which greatly improves scalability of the system and allows for example adding objects properties in real time.

Figure 7:
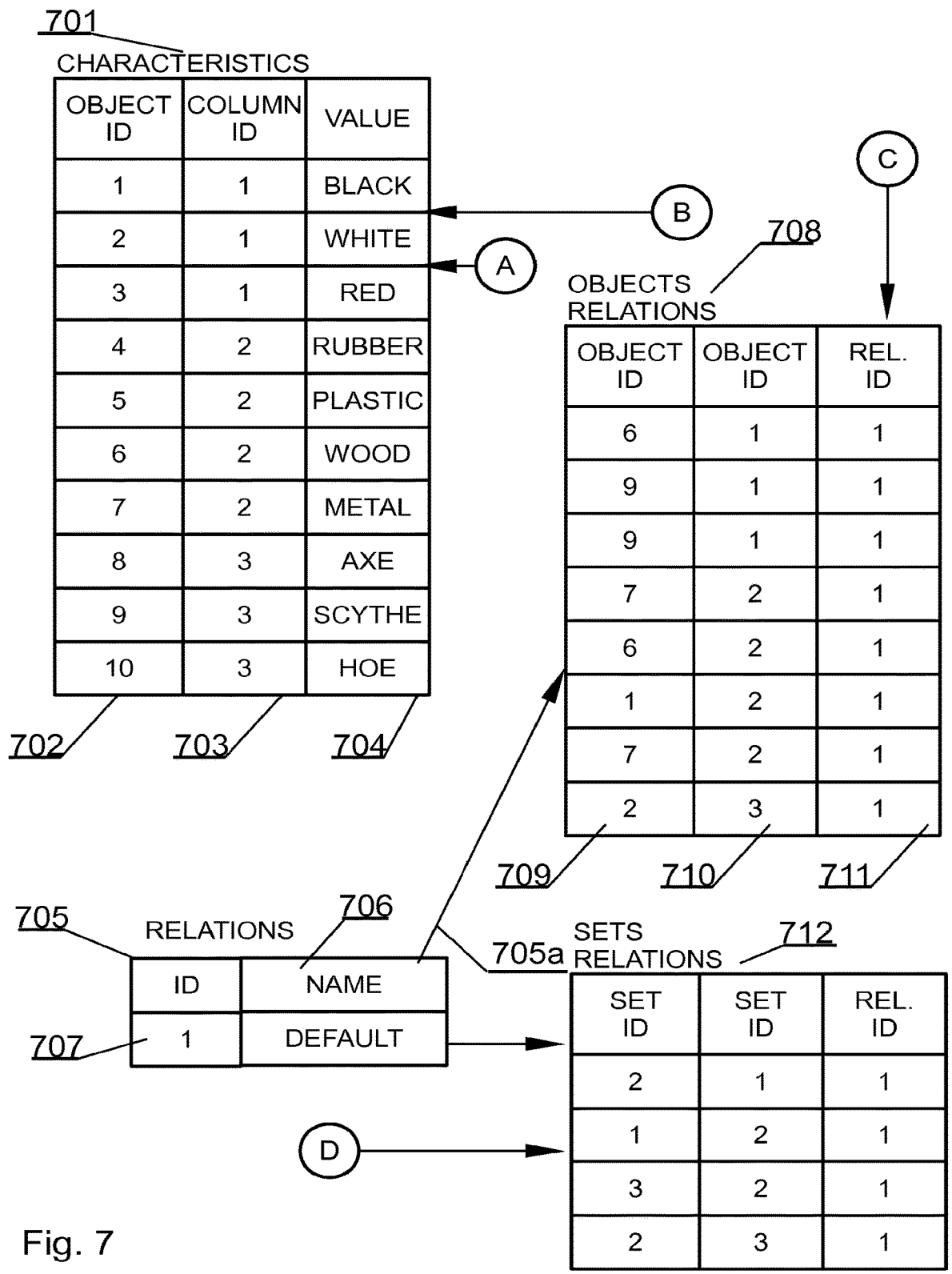

Referring to FIG. 7 CHARACTERISTICS 701 data structure holds entries uniquely identified with an identifier OBJECT ID 702 and is associated with a property, defined in the COLUMNS data structure 606 (FIG. 6), by means of an identifier herein called COLUMNID 703. Further each entry in the CHARACTERISTICS data structure, comprises a value 704 of the given property of the particular object. As indicated by respective arrows originating from sources A and B, the CHARACTERISTICS data structure 701 logically, directly references the COLUMNS data structure and the OBJECTS data structure, because it uses the identifiers from the respective data structures.

A fifth core data structure, of the databases system according to the present invention, is designed to hold data regarding relations present in the database. This data structure has been called herein RELATIONS 705. This is a structure that may hold an identifier of a relation ID 707 and preferably also holds the textual description of the relation i.e. a NAME 706. As indicated by an arrow 705a, the RELATIONS data structure logically, directly references downwards the OBJECTS RELATIONS data structure, because the OBJECTS RELATIONS use the identifiers of the relations.

A sixth core data structure of embodiments of the present invention is the mentioned OBJECTS RELATIONS data structure 708. This data structure is designed to provide mapping between a relation from the RELATIONS data structure 705 and two objects from the OBJECTS data structure 701. For example the first entry in the OBJECTS RELATIONS data structure 708 defines that the relation having Rel.ID 711 of 1 exists between object having an OBJECTID 710 of 1 and the object having an ObjectID 709 of 6.

Optionally a seventh data structure exists in the database system of embodiments of the present invention. This data structure holds data regarding relations between the respective data sets and in FIG. 7 is called SETS RELATIONS 712. This data structure is designed to provide mapping between a relation from the RELATIONS data structure 705 and two sets from the SETS data structure 604. For example, the first entry in the SETS RELATIONS data structure 712 defines that the relation having identifier of 1 exists between a set having an identifier of 1 and a set having an identifier of 2. Providing an entry in the SETS RELATION data structure 712 between a set having an identifier of 1 and a set having an identifier of 2 as well as between a set having an identifier of 2 and a set having an identifier of 1, allows for creating a bidirectional relation.

There is also a possibility of self referencing from a given set in embodiments provided herein. For example such case may be present when there is a set of persons and there exists a student-teacher relation between persons assigned to a particular set.

As described, for example a relational database system of a hundred tables will in the present system be stored in the six above-described data structures. Naturally, most of the data will be kept in the OBJECTS and CHARACTERISTICS data structures.

As can be seen in the mind-map-type database, objects are directly related by means of object relations.

Figure 8:
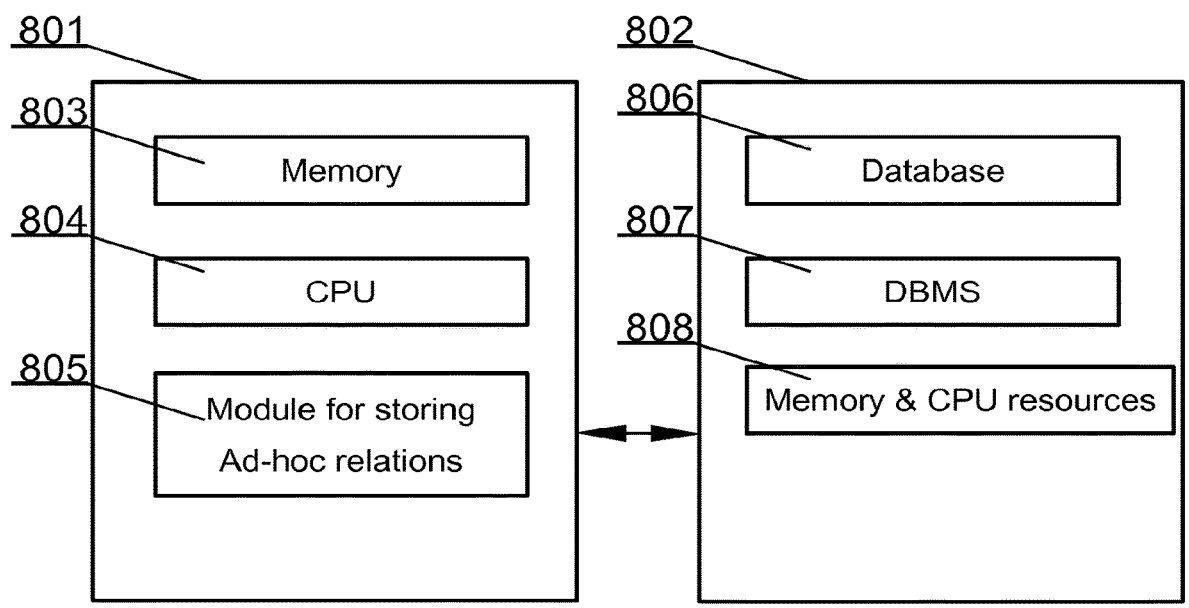
FIG. 8 presents an exemplary database system embodying features of the present invention, for which the present method has been designed and by which it may be implemented.

FIG. 8 presents an exemplary database system embodying features of the present invention, for which the present method has been designed and by which it may be implemented. The database system comprises a client 801 and a server 802. The client 801 accesses the data and is typically a remote terminal from the server 802 that hosts a database 806 and a database management system 807 responsible for responding to client's queries and also having memory and CPU resources 808. The client is typically a computer comprising a memory 803, a processor 804 and a module 805 for executing methods such as those defined in FIG. 4. It will be evident that a suitable communications channel must be established between the client 801 and the server 802.

It can be easily recognized, by one skilled in the art, that the aforementioned a computer-implemented method for executing database queries may be performed and/or controlled by one or more computer programs. Such computer programs are typically executed by utilizing the computing resources in a computing device such as personal computers, personal digital assistants, cellular telephones, receivers and decoders of digital television or the like. Applications are stored in non-volatile memory, for example a flash memory or volatile memory, for example RAM and are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

What is claimed is:

1. A computer implemented method for improving efficiency and reducing computational complexity of executing queries in a database using an electronic computing device, the method comprising:
  (a) creating a database comprising multiple data structures for storing data records, wherein at least one data structure comprises definitions of data object values of at least one data set, wherein a definition of a data object value comprises (i) a data object identifier, and (ii) a unique identifier of a data property that the data object value is assigned to, wherein the at least one data structure has a plurality of data properties such that at least two of the plurality of data properties have different data types;
  (b) identifying a first data property from a plurality of data properties to be used as representative data of a query result for a query executed on said at least one data structure, wherein the first data property has a data type which has both the smallest data size and a unique value in the plurality of data properties and wherein the first data property is identified by a comparison of sizes of a plurality of data types of the plurality of data properties;
  (c) executing a database query on said data records stored using said multiple data structures and identifying a set of data records satisfying the database query;

(d) using the first data property identified in (b) as keys for the set of data records identified in (c), and storing the keys in a hash table;

and (e) upon determining a number of the keys exceeding a pre-defined number, creating a new thread accessing the database to retrieve data from the set of data records and storing the data in the hash table.

2. The computer implemented method of claim 1, wherein the multiple data structures comprise:
   (a) a first data structure comprising definitions of data sets, wherein a definition of a data set comprises (i) a unique data set identifier and (ii) a set name,
   (b) a second data structure comprising definitions of data properties of the data set, wherein a definition of a data property comprises (i) a unique identifier of the data property and (ii) a data set identifier, from the first data structure, that the data property is assigned to, and wherein at least two data properties are characterized by different sizes,
   (c) a third data structure comprising definitions of data objects of the data set, wherein a definition of a data object comprises (i) a unique data object identifier and (ii) a data set identifier, from the first data structure, that the data object is assigned to,
   (d) a fourth data structure comprising definitions of data object values of the data set, wherein a definition of a data object value comprises (i) a data object identifier, from the third data structure, and (ii) a unique identifier of the data property, from the second data structure, that the data object value is assigned to,
   (e) a fifth data structure comprising definitions of relations of the data set, wherein a definition of a relation comprises (i) a unique identifier of the relation and (ii) a name of the relation,
   (f) a sixth data structure comprising definitions of data object relations between the data sets, wherein a definition of a data object relation associates a relation, from the fifth data structure, with two data object identifiers from the third data structure, and
   (g) a seventh data structure comprising definitions of set relations between the data sets, wherein a definition of a set relation associates a relation, from the fifth data structure, with two data set identifiers from the first data structure.

3. The method of claim 2, further comprising creating a mind map structure comprising nodes and directed links, wherein each node of the mind map represents a data set of the data sets and each directed link of the directed links represents a relation in the fifth data structure.

4. The computer implemented method of claim 1, wherein the predefined number is between 75 and 150.

5. The computer implemented method of claim 1, wherein the data retrieved in (g) are stored as values in the hash table.

6. The computer implemented method of claim 1, wherein the database query utilizes UNION operators between SELECT database queries limited with the smallest size.

7. The computer implemented method of claim 1, wherein the executing the database query utilizes, in case of cross-querying numerous data sets, an INTERSECT operator between subqueries related to different data sets.

8. The computer implemented method of claim 1, wherein (e) is performed in multiple threads in parallel for retrieving data from the set of data records identified in (c) and the first data property identified in (b) are the representative data of the set of data records.

9. A non-transitory computer-readable medium comprising machine-executable code that, upon execution by a computer, implements a method for improving efficiency and reducing computational complexity of executing queries in a database, the method comprising:
   (a) creating a database comprising multiple data structures for storing data records, wherein at least one data structure comprises definitions of data object values of at least one data set, wherein a definition of a data object value comprises (i) a data object identifier, and (ii) a unique identifier of a data property that the data object value is assigned to, wherein the at least one data structure has a plurality of data properties such that at least two of the plurality of data properties have different data types;
   (b) identifying a first data property from a plurality of data properties to be used as representative data of a query result for a query executed on said at least one data structure, wherein the first data property has a data type which has both the smallest data size and a unique value in the plurality of data properties and wherein the first data property is identified by a comparison of the sizes of a plurality of data types of the data properties;
   (c) executing a database query on said data records stored using said multiple data structures and identifying a set of data records satisfying the database query;
   (d) using the first data property identified in(b) as keys for the set of data records identified in (c), and storing the keys in a hash table;
   and (e) upon determining a number of the keys exceeding a pre-defined number, creating a new thread accessing the database to retrieve data from the set of data records and storing the data in the hash table.

10. The non-transitory computer-readable medium of claim 9, wherein the multiple data structures comprise:
    (a) a first data structure comprising definitions of data sets, wherein a definition of a data set comprises (i) a unique data set identifier and (ii) a set name,
    (b) a second data structure comprising definitions of data properties of the data set, wherein a definition of a data property comprises (i) a unique identifier of the data property and (ii) a data set identifier, from the first data structure, that the data property is assigned to, and wherein at least two data properties are characterized by different sizes,
    (c) a third data structure comprising definitions of data objects of the data set, wherein a definition of a data object comprises (i) a unique data object identifier and (ii) a data set identifier, from the first data structure, that the data object is assigned to,
    (d) a fourth data structure comprising definitions of data object values of the data set, wherein a definition of a data object value comprises (i) a data object identifier, from the third data structure, and (ii) a unique identifier of the data property, from the second data structure, that the data object value is assigned to,
    (e) a fifth data structure comprising definitions of relations of the data set, wherein a definition of a relation comprises (i) a unique identifier of the relation and (ii) a name of the relation,
    (f) a sixth data structure comprising definitions of data object relations between the data sets, wherein a definition of a data object relation associates a relation, from the fifth data structure, with two data object identifiers from the third data structure, and
    (g) a seventh data structure comprising definitions of set relations between the data sets, wherein a definition of a set relation associates a relation, from the fifth data structure, with two data set identifiers from the first data structure.

11. The non-transitory computer-readable medium of claim 10, further comprising creating a mind map structure comprising nodes and directed links, wherein each node of the mind map represents a data set of the data sets and each directed link of the directed links represents a relation in the fifth data structure.

12. The non-transitory computer-readable medium of claim 9, wherein the predefined number is between 75 and 150.

13. The non-transitory computer-readable medium of claim 9, wherein the data retrieved in (g) are stored in as values in the hash table.

14. The non-transitory computer-readable medium of claim 9, wherein the database query utilizes UNION operators between SELECT database queries limited with the smallest size.

15. The non-transitory computer-readable medium of claim 9, wherein the executing the database query utilizes, in case of cross-querying numerous data sets, an INTERSECT operator between subqueries related to different data sets.

16. The non-transitory computer-readable medium of claim 9, wherein (e) is performed in multiple threads in parallel for retrieving data from the set of data records identified in (c) and the first data property identified in (b) are the representative data of the set of data records.

\* \* \* \* \*